Sept. 1, 1953  R. DAUB  2,650,578
AIR COOLING FOR INTERNAL-COMBUSTION ENGINES
Filed Feb. 12, 1949  10 Sheets-Sheet 5
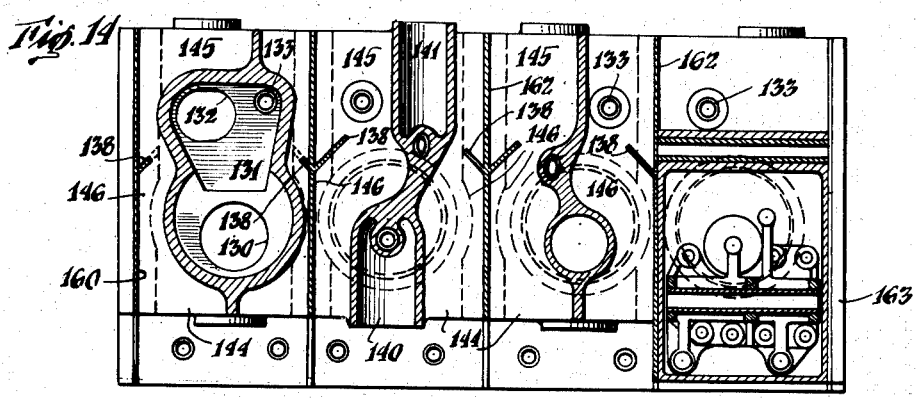
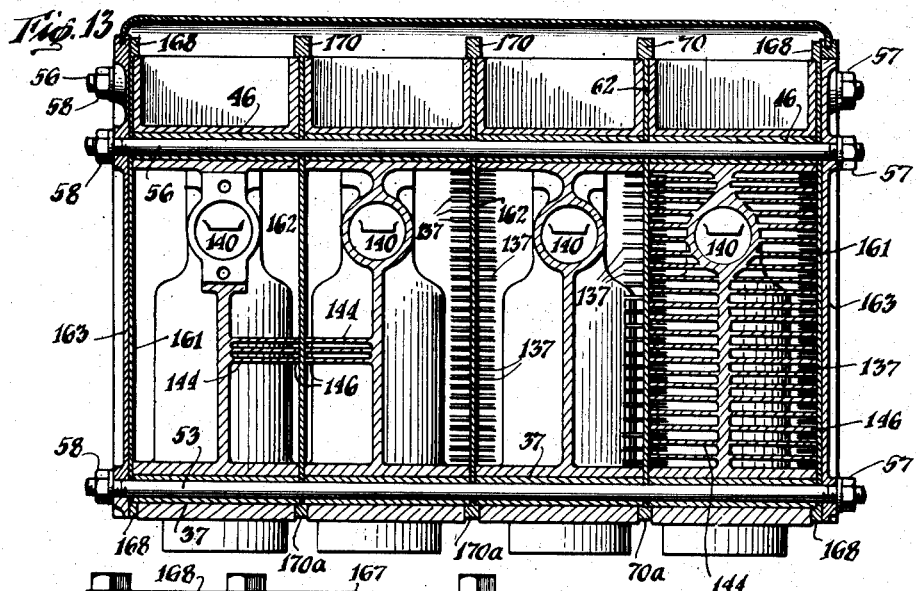
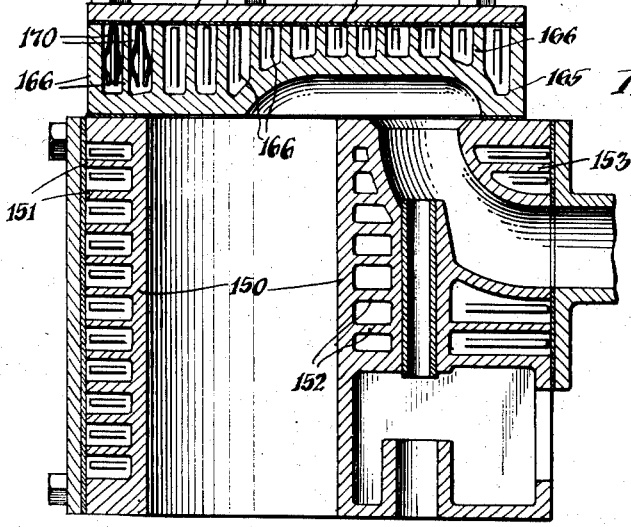
INVENTOR.
Rudolph Daub
BY
Frank A. Bower
ATTORNEY

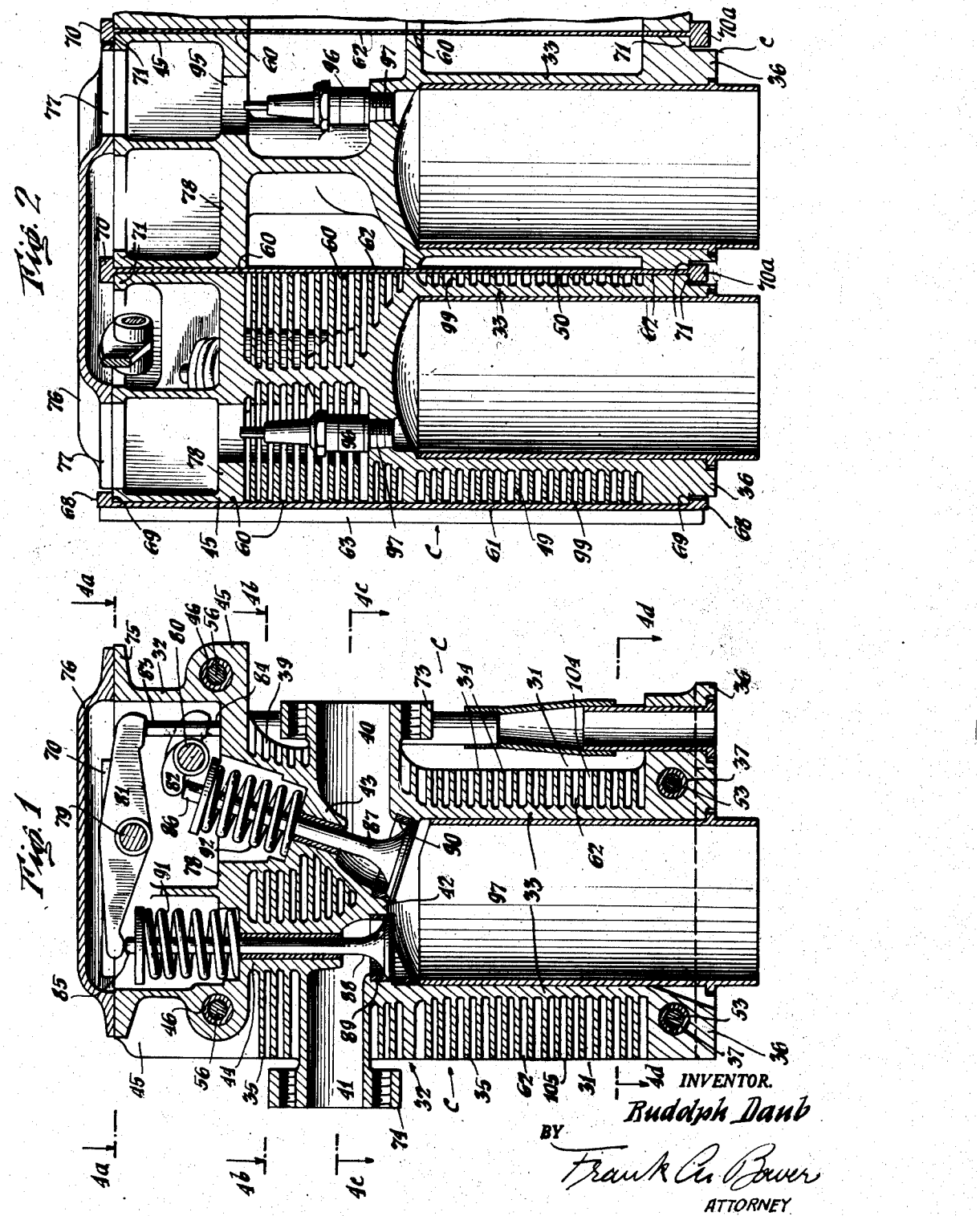

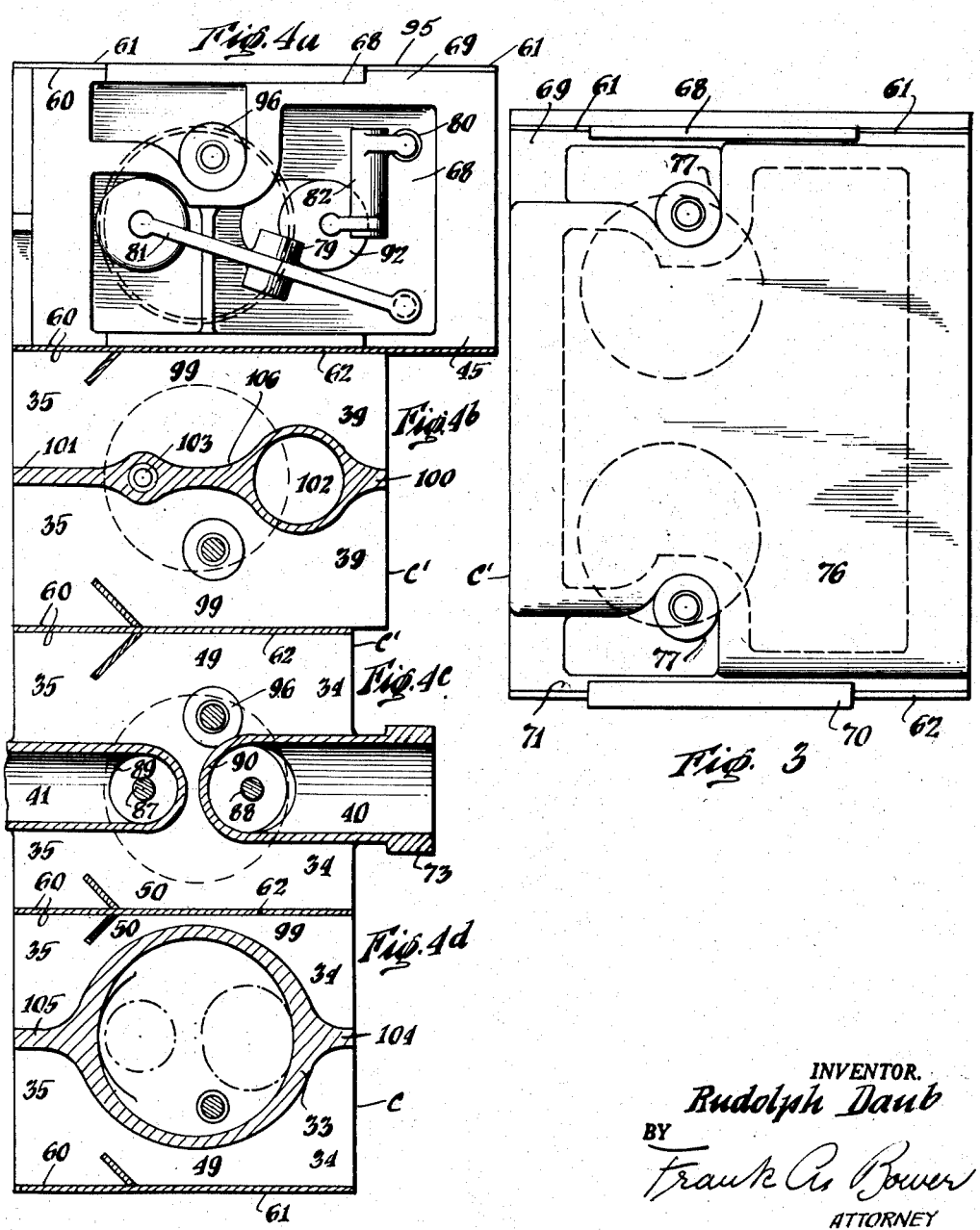

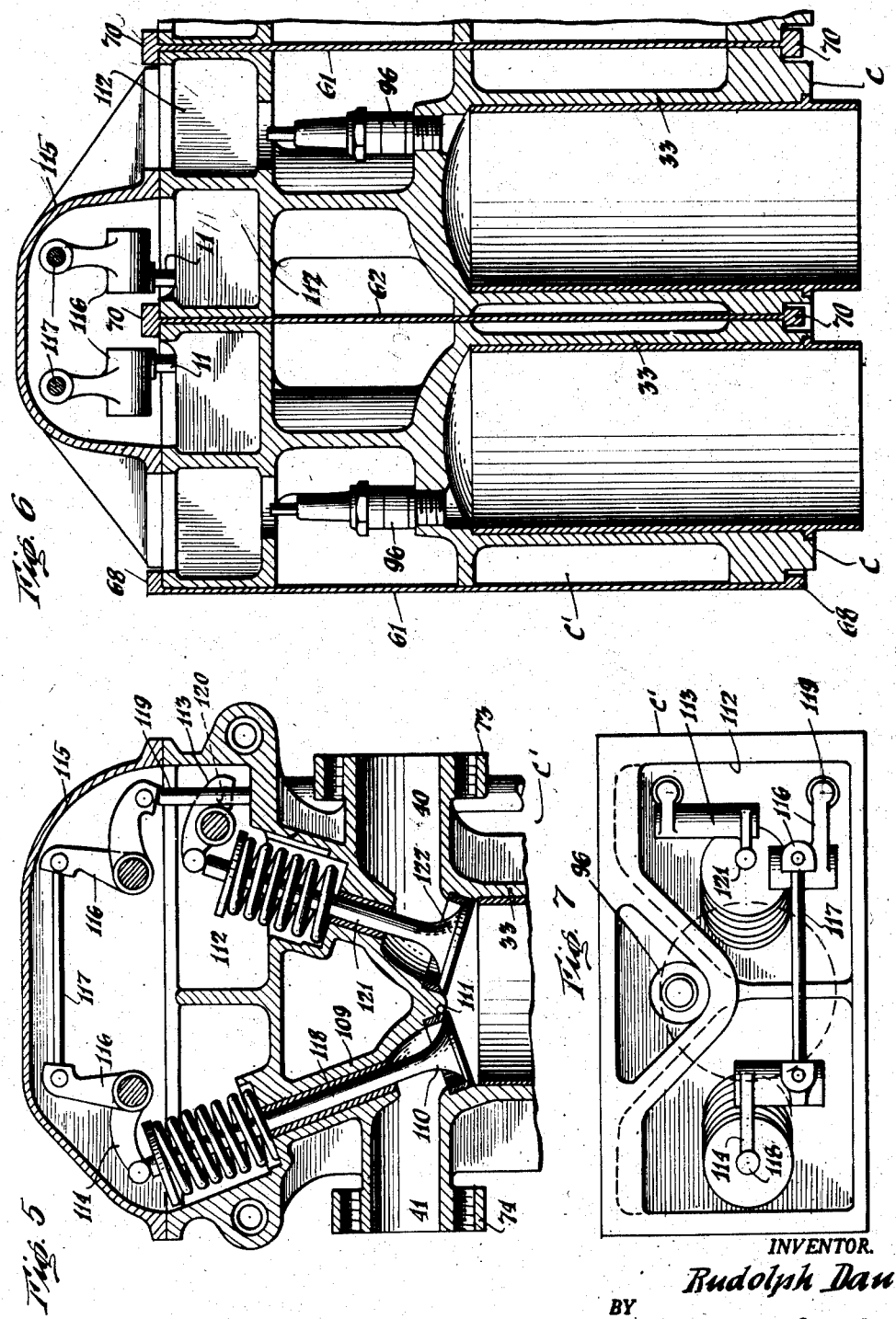

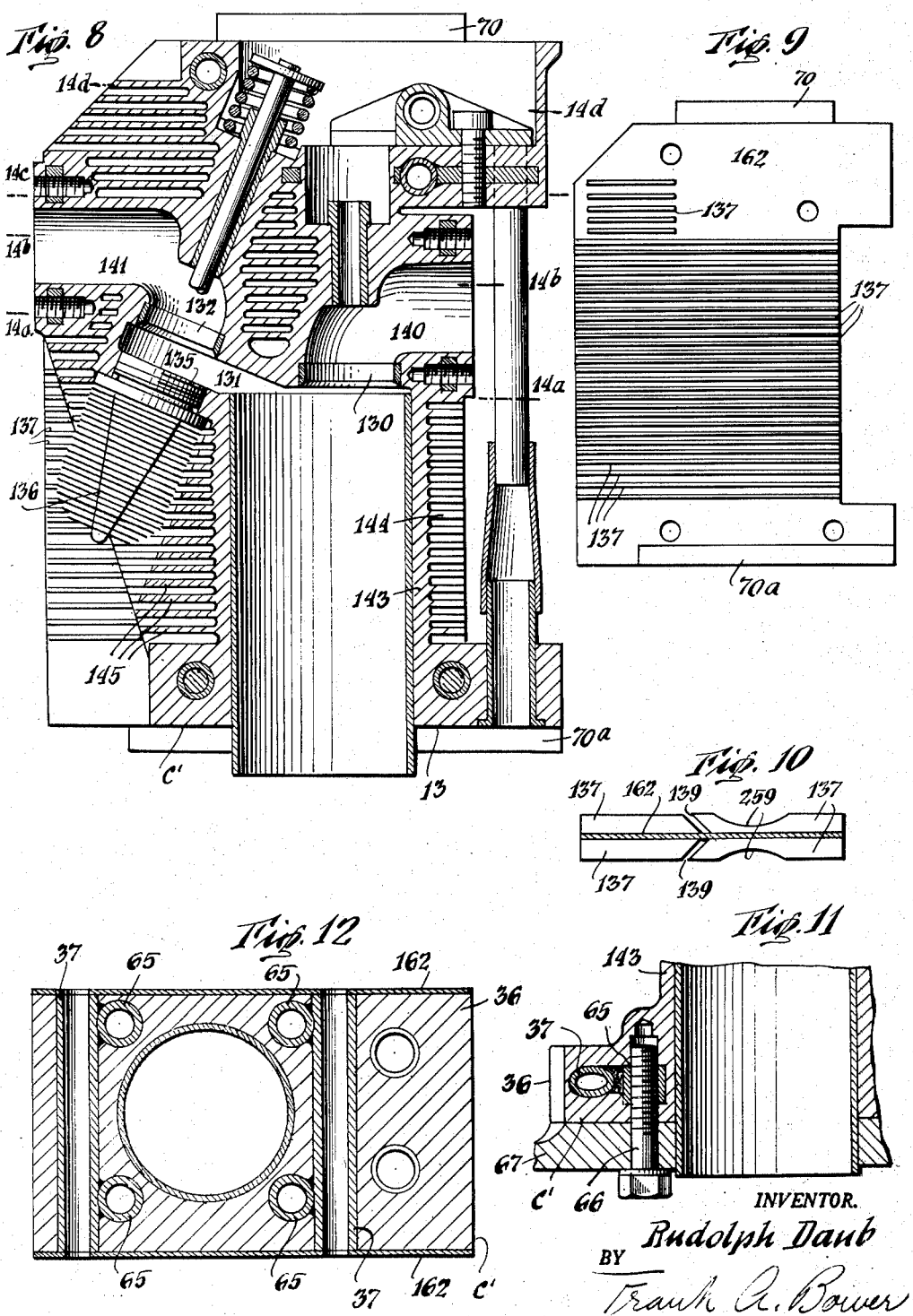

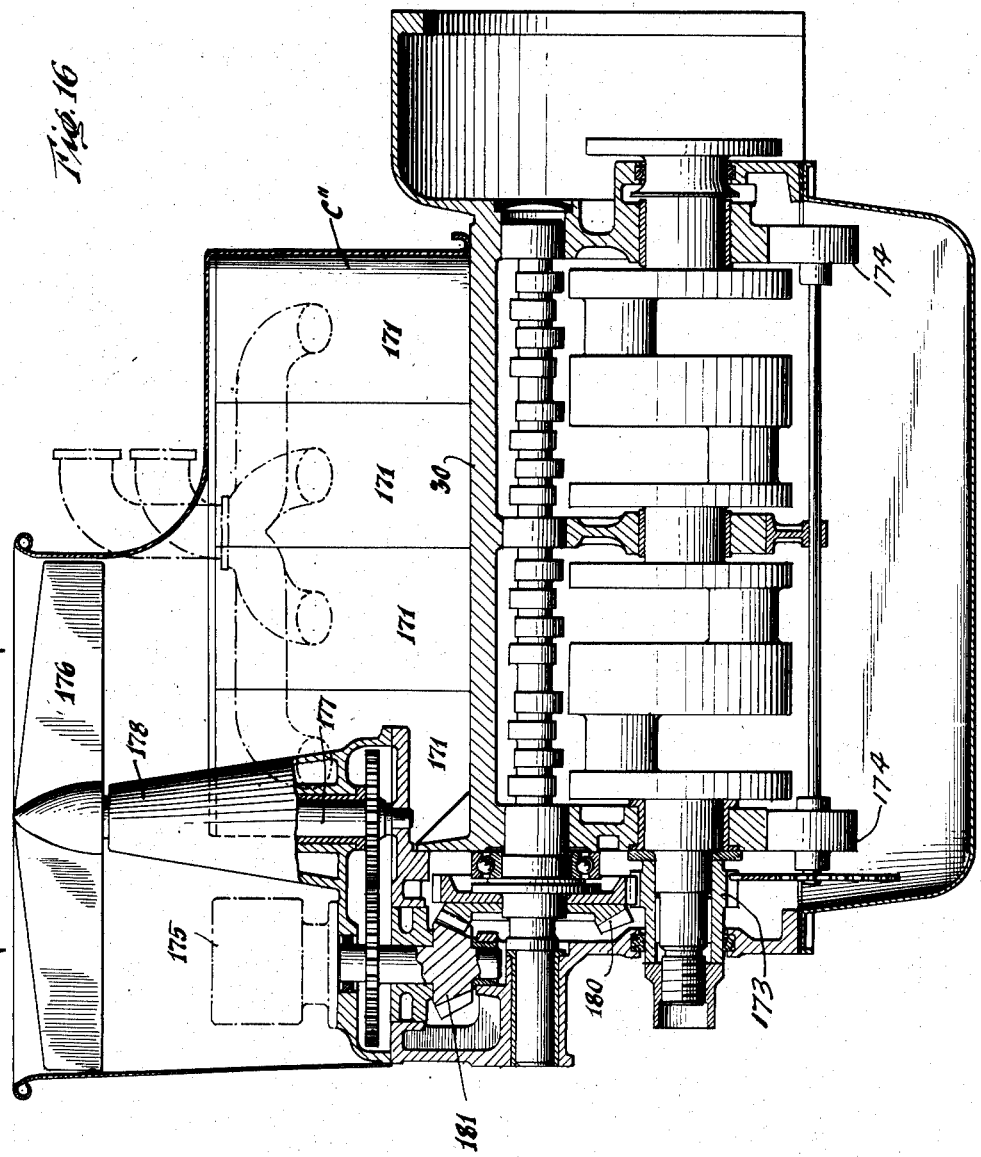

INVENTOR.
Rudolph Daub
BY Frank A. Bower
ATTORNEY

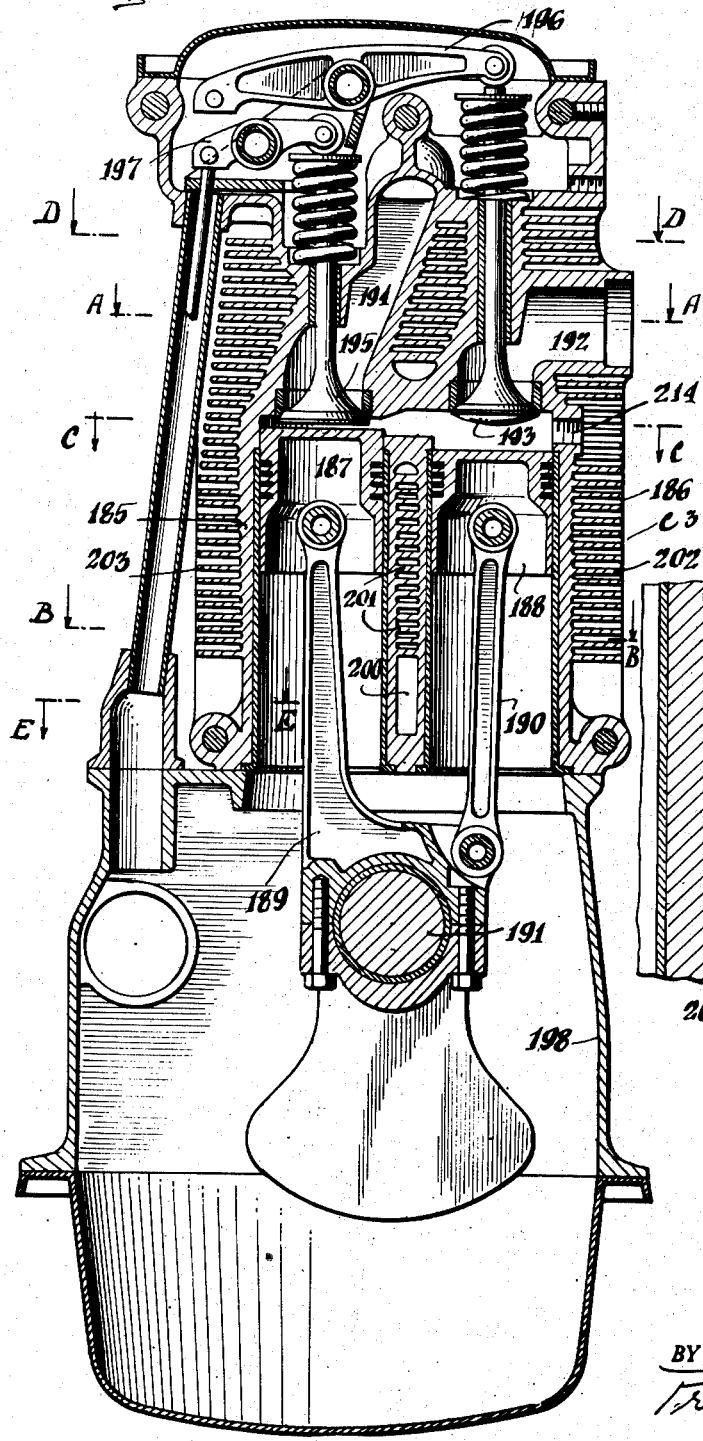
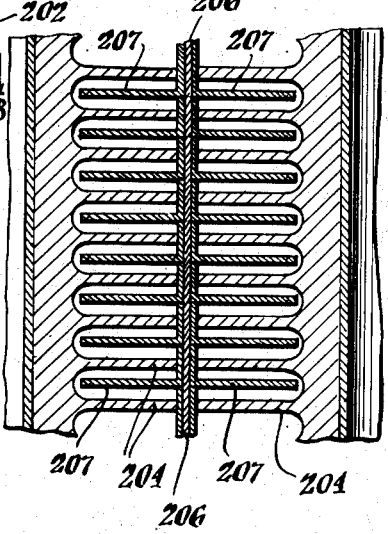

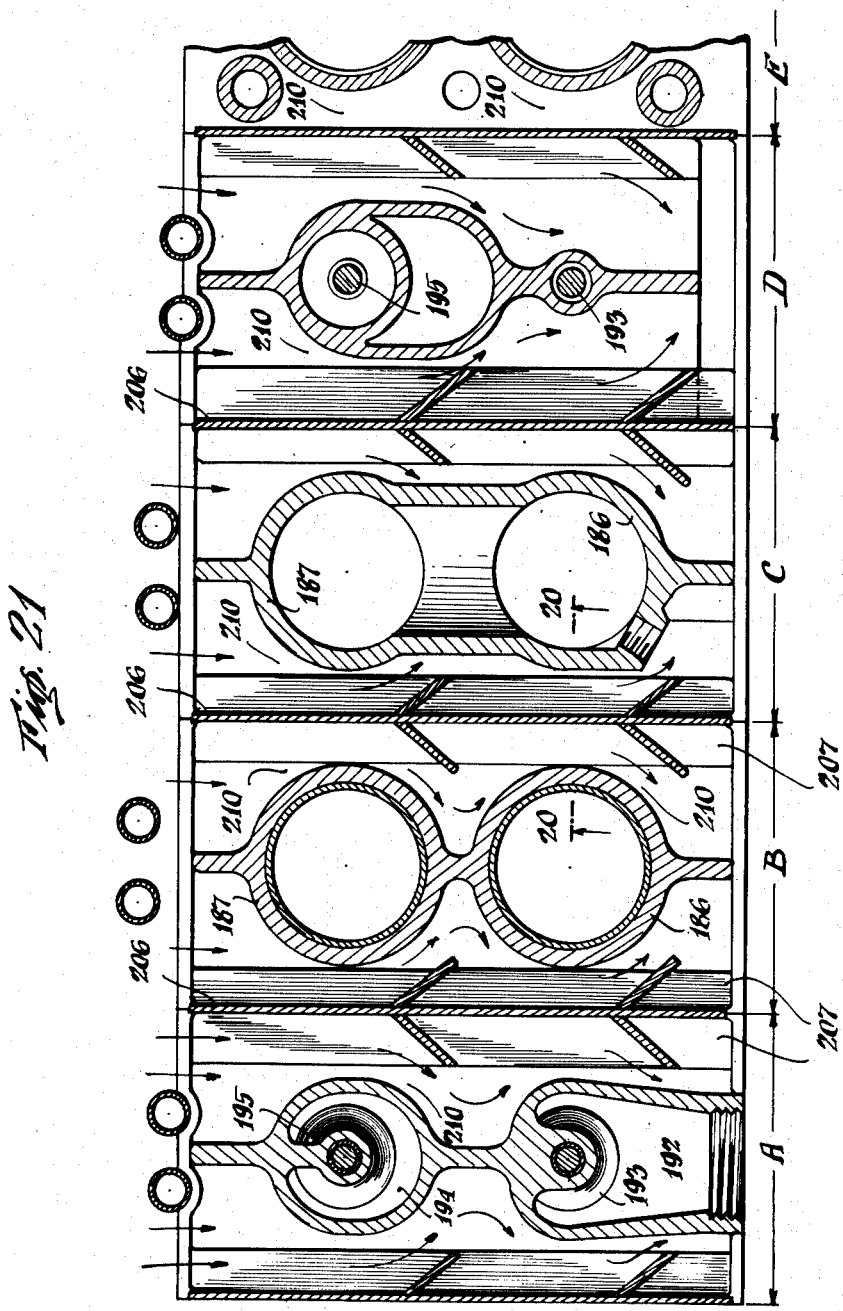

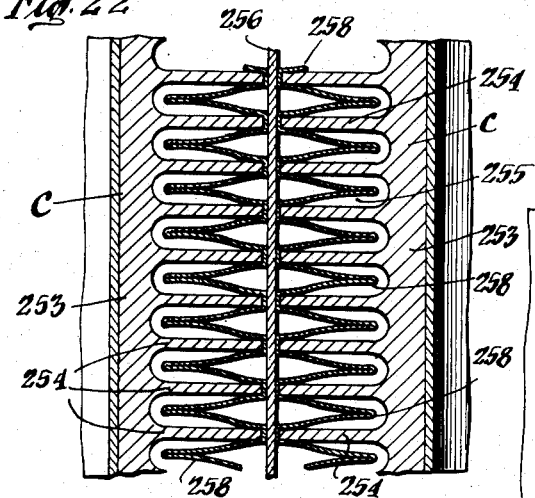
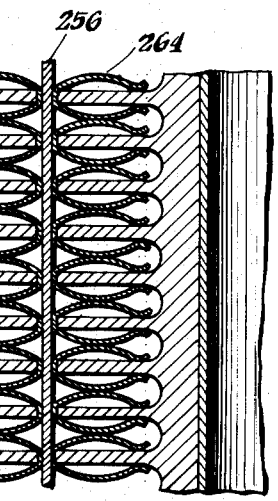
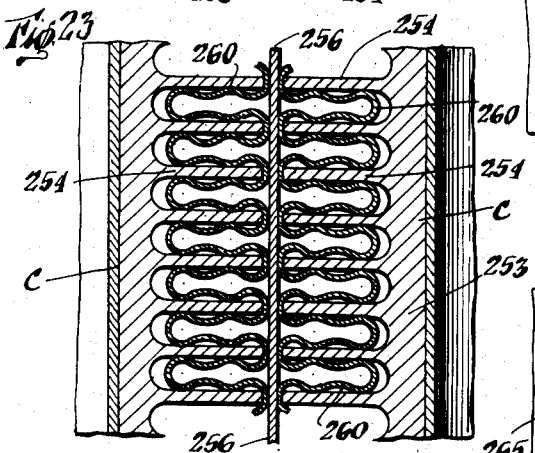
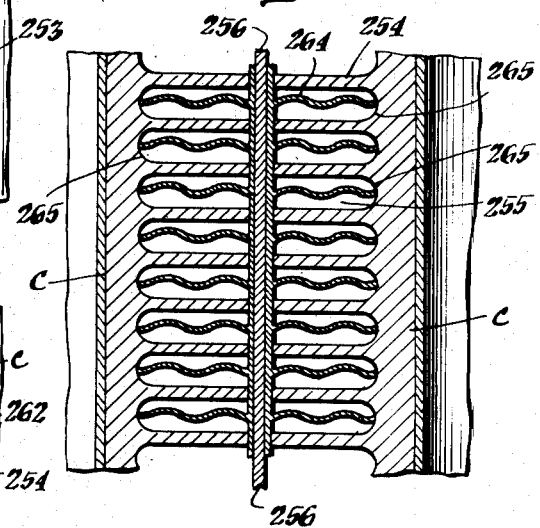
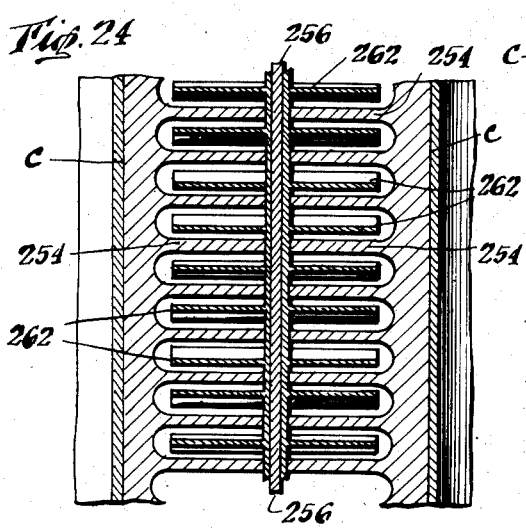

Patented Sept. 1, 1953

2,650,578

UNITED STATES PATENT OFFICE 2,650,578

AIR COOLING FOR INTERNAL-COMBUSTION ENGINES

Rudolph Daub, West Caldwell, N. J.

Application February 12, 1949, Serial No. 76,009

15 Claims. (Cl. 121—41.69)

This invention relates to air cooling for an internal combustion engine.

The object of the invention is to provide an air-cooled internal combustion engine of improved performance and compact in proportion to the power developed and dimensioned and constructed to replace existing liquid-cooled engine designs with a minimum of alterations, retooling and readjustments.

Another object of the invention is to provide an efficient temperature control employing the air cooling to maintain desired performance under all conditions of service and in all climates.

Further objects of the invention particularly in the attainment of lightness, strength and durability will appear from the following specification taken in connection with the accompanying drawings.

In the specific embodiment shown in the drawings (Figs. 8 to 18) the invention is illustrated as applied to an air-cooled V-8 engine and particularly formed and dimensioned to replace the Ford engine Rouge 239, Truck V-8, substituting for this Ford liquid-cooled engine the present air-cooled engine with improved performance and with a minimum of expense in reconstruction, retooling, etc.

To attain this a special unit cylinder structure is employed permitting an integral die casting of the unit with reinforcing parts and extended fin structure and providing a highly efficient combustion chamber. These units embody air-cooling structures and are combined with additional auxiliary air-cooling structures distributed symmetrically for even heat release, and also acting to provide supplemental reinforcement between the ends of the cylinder units.

The structures and parts required for liquid cooling are dispensed with and the complications and hazards attendant on liquid cooling are avoided.

In the accompanying drawings illustrating the invention

Fig. 1 is a cross-sectional view of a typical cylinder of an engine;

Fig. 2 is a similar view taken at right angles to Fig. 1 with parts omitted;

Fig. 3 is a top view of the cylinder;

Figure 17:
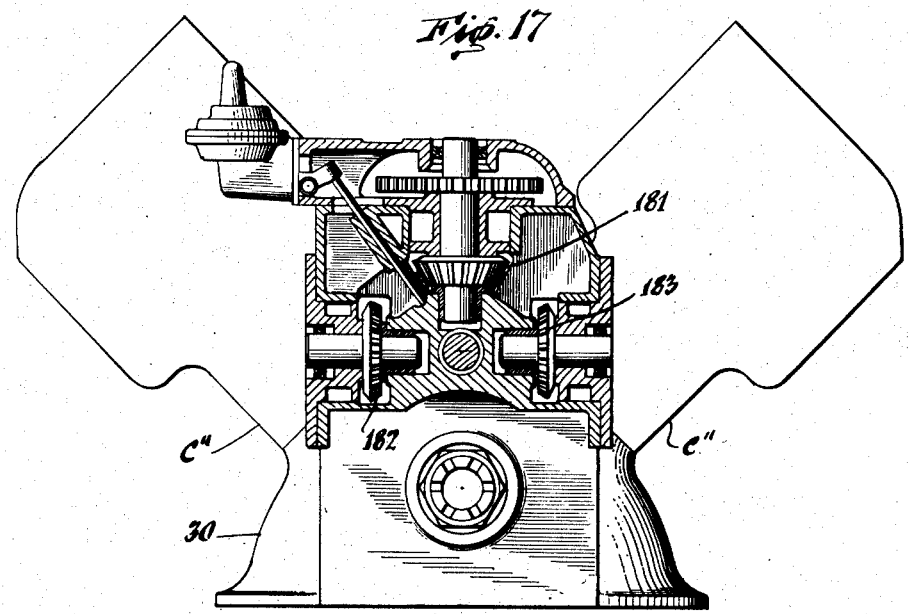
Figure 18:
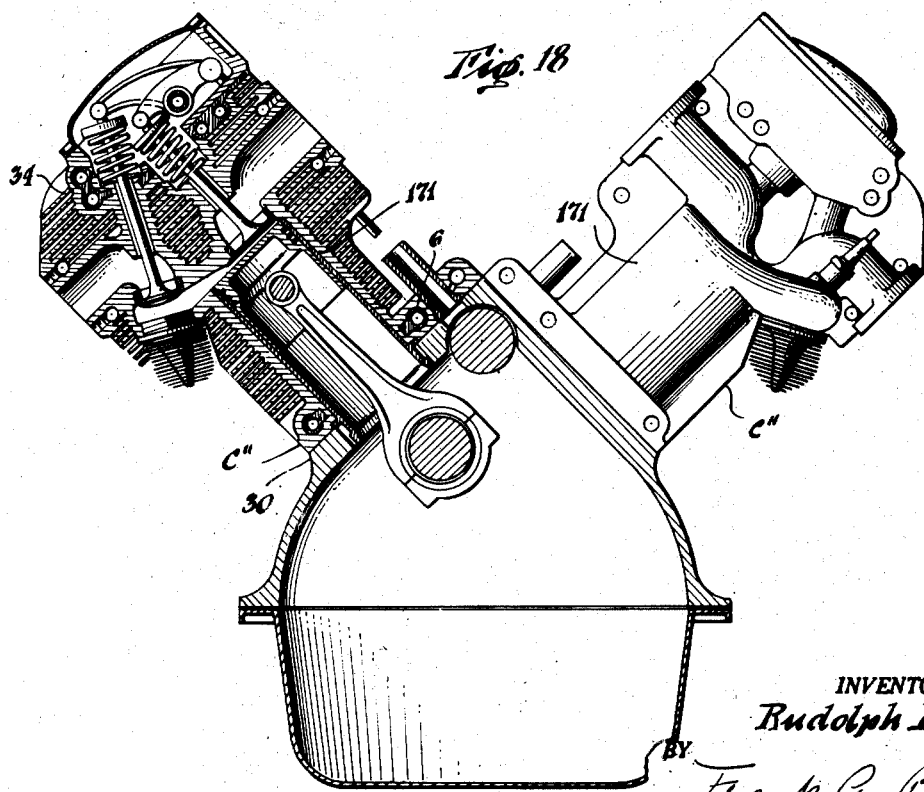

Figs. 4a, 4b, 4c and 4d are transverse outlines of the cylinder parts taken on lines 4a, 4b, 4c and 4d respectively of Fig. 1;

Fig. 5 is a view similar to Fig. 1 illustrating a modified form of valves and showing only the top of the cylinder;

Fig. 6 is a sectional view at right angles to Fig. 5 in a plane through the cylinder centers;

Fig. 7 is a top plan view of the cylinder shown in Fig. 5 with the cover removed;

Fig. 8 is a view similar to Fig. 1 illustrating a further modified construction;

Fig. 9 is a face view of a plate structure gripped between the cylinders;

Fig. 10 is a horizontal sectional view of the plate shown in Fig. 9;

Fig. 11 is a sectional view of a detail showing the fastening of a cylinder to the crankcase;

Fig. 12 is a cross-sectional view of the base flange of the cylinder;

Fig. 13 is a sectional view through a group of four cylinders as a unit with parts omitted to show the construction beneath;

Fig. 14 is a top view of the cylinders of Fig. 13 showing sections at different levels;

Fig. 15 is a longitudinal sectional view of a further modified form of engine cylinder;

Fig. 16 is an elevational view with parts in section and parts omitted showing the mounting of the engine on a crankcase and the supply for the cooling air;

Figs. 17 and 18 are transverse elevational views of the engine with parts in section and parts omitted;

Fig. 19 is a vertical sectional view of a modified form of engine embodying twin cylinders with overhead valves;

Fig. 20 is a transverse vertical sectional view of a detail taken on line 20—20 of Fig. 21;

Fig. 21 is a series of horizontal sections of the engine shown in Fig. 19 taken on the lines A—A, B—B, C—C, D—D and E—E, with parts omitted; and Figs. 22 to 26 are sectional views illustrating modifications of radiating fins between the cylinder blocks.

Preferably the engine structure comprises a unit of a single cylinder block as illustrated. Each cylinder block C is formed as a separate die casting as the basic unit either individually or to be grouped with others. These units C are mounted on the crankcase, for instance, as illustrated at 30 in Fig. 18, in desired number and arrangement to provide the specified horsepower.

Each cylinder block has an inner or crank portion 31 and an outer or head portion 32, the material preferably being aluminum alloy. The crank portion comprises a cylinder 33 with face fins 34, 39 and rear fins 35 and base flange 36 in which are cast reinforcements 37 of steel. The head portion 32 has the intake 40 on the face side and exhaust 41 on the rear with the bridge and head structure 42 between. Above are the valve stem housings 43, 44 leading to the crown casing 45 of generally rectangular form provided with cast-in reinforcing structure 46. Face fins 34 are on the inlet side and rear fins 35 around the exhaust, these fins continuing around between front and rear as side fins 49, 50.

The reinforcements 37 are formed as tubular portions having through-bores for longitudinal bolts 53 (Figs. 1 and 13) drawing the cylinder blocks together. Similar tubular portions are provided by the outer or head reinforcements or inserts 46 through the bores of which pass the longitudinal bolts 56.

The sides 60 of the cylinder units C and their side fins 49, 50 are planed flat and provided with the plate structures 61 and with the intermediate plate structure 62 between the cylinders. End plates 163 are provided (Fig. 13) bearing against the outer plates 61 to press them snugly against the planed ends of the side fins 49, 50 under the tension of the longitudinal bolts 53, 56 drawn tight by nuts 57, 58. There are two bolts 53 running through the inner part of the cylinder blocks adjacent the crankcase and the tubes 37 sleeved on these bolts are provided with threaded bushings 65 (Figs. 11 and 12) welded to the tubes 37 and extending parallel to the cylinder axis to receive the studs 66 extending through flange 67 of the crankcase to fasten each cylinder block C to the crankcase.

The outer and inner side plates 61, 62 are preferably of bronze or the like and may have a coefficient of expansion slightly less than that of the aluminum alloy of the cylinder blocks C. The outer plates 61 have enlarged upper and lower end flanges 68 tightly engaged over the edges 69 of the cylinder blocks C and applying a compressive force between the ends of the block particularly in heated condition of the parts. Similarly the inner plates 62 have enlarged flanges 70, 70a engaging over the edges 71 of the cylinder blocks and applying compressive forces and acting to transmit the stresses against the cylinder head to the base flanges 36 of the cylinders and thus relieve the tensions on the cylinders 33 themselves. These end flanges 68, 70 are located toward the centers of the plates, 61, 62 (Figs. 3 and 4a) for a distance corresponding generally to the diameter of the cylinder structure 33 (Fig. 4d). The inner flanges 70a (Fig. 9) extend further in each direction.

The intake 40 and exhaust 41 are provided with protruding ends flanged as shown at 73, 74 and tapped and threaded for attachment of the intake and exhaust manifolds and the top edge of the crown structure 45 is flanged as shown at 75 and receives the cover 76 recessed at spark plug orifices 77. The base 78 of the crown structure 45 carries brackets (not shown) in which are supported the ends of the journals supporting the hubs 79, 80 of valve tappet levers 81, 82 (Figs. 1 and 4a) engaged by valve tappets 83, 84 and engaging valve stems 85, 86 of valves 87, 88 against seats 89, 90 and closed by springs 91, 92.

The exhaust valve 88 is preferably in line parallel to the axis of the cylinder and intake valve 87 at an angle thereto as shown, both valves having their seats 89, 90 in the head of the cylinder to give an "overhead" construction. The flanges 73, 74 at the intake and exhaust passages 40, 41 provide for attachment of the manifolds (Fig. 16).

In order to maintain the engine within the compact overall lengths standard for liquid-cooled engines, a special design and extensive cooling fin structure is provided. Each cylinder block C is of generally rectangular configuration in successive sections (Figs. 4a, 4b, 4c and 4d). The crown structure 95 is box-like providing an opening for insertion of the spark plug 96 in the spark plug opening 77 in the head of the cylinder alongside the exhaust valve. Then in the next lower section (4b) the die casting is finned in on both sides with fins 34, 39 in the front (intake) and fins 35 at the rear and connecting side fins 99 extending between them so that a single fin structure extends around the cylinder in a single plane. These fins are evenly spaced a minimum distance for efficient cooling and are thin with resultant large number.

The edges of the cast fins are planed as at 60 to accurate contact with the tension plates 61 and 62 with which they are drawn into tight engagement so as to absorb and distribute the heat additionally by conduction, these plates fitting closely to the transverse faces of the cylinder blocks as indicated in Figs. 2 and 4a to 4d.

As indicated in Figs. 4b–4d a generally rectangular outline of the fin edges is maintained within which (Fig. 4b) at the center from front 100 to back 101 is the partition 106 widened at its inner portions to provide the opening 102 for the intake valve spring 92 and at 103 for the exhaust valve stem 85. At the section of Fig. 4c the intake 40 and exhaust 41 lead inward to the valve seats and at Fig. 4d the section is taken through the cylinder 33 provided with front ridge 104 and rear ridge 105.

In the modification shown in Figs. 5 to 7 the lower or inner portion of the cylinder blocks C' are similar to those of the earlier figures, as indicated in Fig. 6. Exhaust valve 110 and its housing 109 are at an angle and with the valve seat 111 at a corresponding inclination. The crown structure 112 is lower and is provided with brackets (not shown) for the journals of hubs of the intake valve tappet 113 and exhaust valve tappet 114 while the cover 115 supports brackets for the bell cranks 116 joined by links 117 to actuate the exhaust valve stem 118 from the tappet rod 119. Tappet rod 120 engages tappet 113 to actuate the stem 121 of intake valve 122 also set at an angle.

In these Figs. 5 to 7 as well as in one side of Fig. 2 the cooling fins are omitted for the sake of simplicity, it being understood that they are provided in all of the cylinder blocks.

The cylinder block C of Figs. 8 to 14 is of the "F" type positioning the intake valve seat 130 over the cylinder as shown (Fig. 8) so that the intake valve is of the overhead type. The combustion chamber has an extension 131 at an angle and spreading out from the cylinder (Fig. 14) with the exhaust valve opening 132 and spark plug 133 in the widened portion. Opposite the exhaust valve a cooling plug 135 is provided having a protruding outer portion 136 with fins 137 as shown. The intake 140 curves through a right angle and the exhaust 141 through an angle of about 110 degrees. The cylinder 143 is cast with surrounding fins, front or face fins 144 being connected to rear fins 145 by side fins 146, the side edges of the fins being preferably machined to plane surfaces at 160 flanged as at 168 and engaging snugly against the end plates 161 and middle plates 162 between the cylinder blocks, the lines of engagement being between the fins 137 shown on the face view of an intermediate plate 162 having top flange 170 and bottom flange 170a. These fins 137 are shown of U-shape attached at their yoke portions to each side of each plate 162 and the inner sides of end plates 161 by welding or brazing, for instance, and projecting into the spaces between the cylinder fins and greatly augmenting the fin area exposed to the air flow. The heat is conducted through the fins to the plates and distributed in all directions depending on the areas of greatest heat removal by the air flow. The U-fins 137 in turn carry the heat from the plates into extended contact with the airflow between the cylinder block fins.

To spread the air currents around behind the cylinders baffle strips 138 are provided at an angle to the plates and running vertically through corresponding spaces 139 (Fig. 10) formed by the fins 137. In Fig. 13 a large portion of the fins cast integral with the cylinders are omitted to show the cylinder structure more clearly.

Fig. 15 illustrates an L-head cylinder with the air-cooling outer construction including fins 151, 152, 153 cast integral with the cylinder 150, plates 154, 155 carrying auxiliary fins 156, 157 being clamped against the fin edges by member 158 and the manifold flange 159. The cylinder head 165 has fins 166 with top plate 167 tightly fitted to the fin edges by cap plate 168 carrying auxiliary fins 169 of U-shape brazed in place. A modified form of U shape auxiliary fin is shown at 170 convex on each side and making spring contact with the sides of the fins 166.

Fig. 16 is a side view showing diagrammatically and in section a typical V-8 engine with air cooled cylinders 171 of cylinder blocks C″ on the crank case 30 (see Figs. 17 and 18). The crank shaft gear 173 drives the oil pumps 174 in the oil pan below and is also geared to drive the governor 175 and fan 176 on spindle 177 in pedestal 178 mounted on the crankcase. A casing structure 179 encloses the V space between the cylinders so as to force the air in the center and outward between the cylinders 171 so as to abstract the heat from the extensive main and auxiliary fins. These surround and extend between the cylinders as previously described. In Fig. 17 the cylinder blocks C″ are indicated in outline and the block C″ to the right of Fig. 18 is shown without the fins to make the structure clearer. Gear 180 driven from the crankshaft as shown drives gear 181 for the governor and fan gear 182 for the generator and gear 183 for the magneto. The cylinder blocks of these Figs. 16-18 may be as shown very similar to those illustrated in Figs. 8-14.

In Figs. 19-21 a vertical in line engine has cylinder blocks C‴ each comprising twin cylinders 185, 186 with pistons 187, 188 and connecting rods, main and auxiliary 189, 190 to bearings of crankshaft 191. Exhaust port 192 has valve 193 and intake port 194 has valve 195, both valves being actuated by overhead levers 196, 197 operated from a countershaft in the crank case 198 in conventional manner.

The cylinders 185, 186 are separated by space 200 with fins 201 and the cylinders are surrounded by outer fins 202 in part, 203 at the rear and 204 at the sides. Intake port 194 and intake valve 195 are surrounded by fins 205 and the side edges of the fins are planed to fit against an auxiliary radiating structure of the type above described including a plate 206 and auxiliary fins 207 (Fig. 20) having base flanges 208 at right angles and gripped between the plate 206 and the ends of the fins. These auxiliary fin flanges are dimensioned to stack together as shown positioning these fins 207 in the spaces between the cast fins 204 and extending close to the cylinder surfaces or in contact therewith.

As shown in Fig. 21 the cylinder block centers may be spaced for instance as in the previous Figs. 14-18 leaving relatively large transverse passages 210 between the cylinders due to their smaller diameters. The fins 204 are omitted from this Fig. 21 to make the showing of the remaining structure clearer. The auxiliary fins 207 and the main fins 204 are grooved vertically at an angle for the deflectors 211 forcing the air currents to follow around the cylinder surfaces and the valve stem housings 212, 213 for thorough cooling.

In operation the pistons 187, 188 move upward together to compress the charge which is ignited by the spark plug in opening 214, after which the pistons move down together in the power stroke. The heat is conducted through the cylinder walls and the division of the cylinder block into two cylinders augments the cooling effect in increasing the conducting and radiating areas and at the same time reducing the piston size to bring the center of the piston top near to the cylinder walls to conduct away the heat.

The critical maximums of heat radiation at the outside are generally concentrated in the areas between the cylinders. Here the convection by the forced air blast must have extensive area of contact within a limited space. At the same time there must be continuous conducting paths of metal carrying the heat to these surfaces.

The criterion of effectiveness is the amount of heat carried away by the air all of which should be raised to a high temperature as it passes. Given the metal structure to provide the conduction and surface area it is then only a matter of supplying the airflow in most efficient amount regulatable by the pressure applied.

The system of this invention provides a labyrinth of air passages in direct surfacing with metal conducting the heat in short paths from the explosion, so that the temperature and consequently the efficiency of the power development may be accurately controlled.

The better the radiation to the air the higher the temperatures which may be tolerated in the explosion chamber with consequent gain in motor efficiency. Where there is a spot of deficiency in radiation and its attendant overheating, the chamber temperature has to be correspondingly limited. By emphasizing the conduction and radiation at the critical areas between the cylinders the cooling effect is equalized around each cylinder in a manner permitting accurately limited high temperatures for the cylinders.

A great increase in the conducting and radiating effects between the cylinders is attained by the auxiliary fin structures interleaved with the cylinder fins in thoroughly cooperative manner with no increase in overall dimensions and with little increase in weight or cost.

In Figs. 22-26 various forms of auxiliary fins are shown clamped in place on the outer ends of the fins. The walls 253 of the cylinder blocks C are determined by structural considerations and the fins 254 are about $\frac{1}{16}$″ at their tips and $\frac{3}{32}$″ at their roots and spaced apart about $\frac{1}{16}$″ or over, the intervening spaces 255 being of variable depth with a minimum depending on the contour and spacing of the cylinders, etc. In the engine of this invention this depth may be reduced to a fraction of an inch giving less than one inch between the bottoms of opposite grooves 255, and in the specific examples shown this minimum depth is about ½" with consequent close spacing of the cylinders and saving in overall length of the engine.

Preferably the bottoms of the grooves 255 are rounded somewhat as indicated (Figs. 22-26). Due to the heat absorbing and distributing plates 61, 62, 256, high temperature areas between the cylinders will be relieved by conduction of the heat in all directions and radiation to the passing air currents over a greatly expanded surface concentrated within a relatively small space close to the cylinder.

The auxiliary fin structure interposed in grooves 255 may be of U-form or L-shape as previously described or as shown in Figs. 22-26. Here (Fig. 22) a sheet 258 of copper or other conducting metal or alloy is preformed to folded shape fitting the fins 254 and re-entrantly extending toward the bottoms of the grooves 255 and dividing each groove into three channels, two near the fin roots and one at their tips. The depth of the auxiliary fins normal to plate 256 will be considerably greater than the minimum depth of the grooves 255 and as indicated at 259 in Fig. 10 the auxiliary fin structure will be circularly cut out to conform to the groove bottoms at the area of least separation of the cylinders, being reduced to about one-half to one-quarter of the full depth shown in Figs. 25-29.

In Fig. 23 the auxiliary fin structure 260 is folded and each fold corrugated to spring-fit the sides of the fins 254 and give four additional contacts with six air channels, while in Fig. 24 L-shaped auxiliary fins 262 are stacked and gripped as described in connection with Fig. 20 but with the fins in the grooves waved or corrugated across the lines of airflow to increase the turbulence and augment the effective contact between the air and the metal surfaces. In Fig. 25 separate U-shaped fin structures 263 are sprung onto the fins 254 giving four air channels and in Fig. 26 L-shaped fin structures 264 are nested as in Fig. 20 with the fins in the grooves corrugated and dimensioned to spring fit against the groove bottoms 265. Other similar auxiliary fin formations may be adopted within the scope and principle of this invention and while the various modifications have been preferably illustrated in connection with plates 256 this plate may be omitted so that the clamping of the cylinder blocks C will press the auxiliary fin structures together in direct engagement with each other.

The heat conducted through the cylinder walls and fins is picked up by the air currents along the fins and also by conduction from the cylinder fins to the auxiliary fin structures which not only increase the area of contact with the air currents for additional radiant and convection exchange but also distribute the heat over these larger areas in all directions while at the same time imposing additional turbulence on the passing airflow. This system thus attains an increased effectiveness and efficiency of the heat exchange by concentrating the conduction and radiation members within relatively small space and at the same time increasing the convection by forcing the air through the resulting multiplied channels.

There is thus attained a great increase in the fin area without adding to the bulk of the cylinder block, as evidenced by the close spacing of the cylinder centers in Figs. 2, 4a-4d and 16, for instance. Here cylinders with bores of 3 1/16" have their centers spaced 4" apart at the end pairs leaving between the cylinder bores less than one-third of the bore diameter. The over-all length of the four in-line cylinder blocks (Fig. 16) is only 18" with an allowance of 5" between the centers of the middle cylinders or 13" between the centers of the end cylinders as in the conventional liquid-cooled engine. This means that the length is the same as for liquid cooling and the very hottest portions between the cylinders have a radial width as low as one-third of the bore and not over two-thirds of the bore. In this space are the two cylinder walls, the main and auxiliary fins and the distributing plate whereby the heat is carried away and delivered to the passing air currents.

This compactness is attained without added complication in the cylinder structure or the casting procedure. The auxiliary fins are readily formed by stamping and pressing and easily assembled in place and the cylinder blocks are assembled and bolted together as a rigid unit similar to a liquid-cooled block casting.

The accessories for handling cooling liquid are dispensed with entirely and the engine performance is improved in efficiency and the weight reduced.

I claim:

1. In an air-cooled internal combustion engine, the combination of a plurality of cylinder blocks having peripheral radiating fins, of metal plate means between said blocks and in contact with said fins and acting to distribute and dissipate heat received from said fins, tension means clamping said cylinder blocks against said plate means, and means for mounting said cylinder blocks on the crankcase of the engine.

2. An air-cooled internal combustion engine as set forth in claim 1 in which the cylinder blocks and plate means have interengaging parts placing the plate means under tension and the cylinder block under compression.

3. An air-cooled internal combustion engine as set forth in claim 1 in which the cylinder blocks and plate means have interengaging parts placing the plate means under tension and the cylinder block under compression when the engine is in operation.

4. In an air-cooled internal combustion engine, the combination of a plurality of cylinder blocks having radial radiating fins, of metal plate means between said blocks and in contact with said fins and acting to distribute and dissipate heat received from said fins, tension means clamping asid cylinder blocks against said plate means and means for mounting said cylinder blocks on the crankcase of the engine.

5. In an air-cooled internal combustion engine, the combination with a plurality of separate cylinder blocks, of plate means between them, means for clamping said blocks against said plate means, fins on said blocks having their ends contacting said plate means and conducting heat thereto from the cylinders and forming air passages extending transversely along said plate means between said cylinder blocks from front to back of the engine, and means for forcing air through said passages.

6. An air-cooled internal combustion engine as set forth in claim 5 in which deflecting means are interposed across said fins and air passages to direct the air currents away from said plate means and toward said cylinder blocks.

7. An air-cooled internal combustion engine as set forth in claim 5 in which there are auxiliary fins contacting said plate means and extending between said fins.

8. An air-cooled internal combustion engine as set forth in claim 5 in which there are auxiliary fin means contacting said plate means and consisting of folded metal sheets with the folds thereof extending into said air passages.

9. In an air-cooled internal combustion engine, a rigid engine block comprising a series of individual cylinder blocks of rectangular peripheral formation in transverse section bolted together and each block having straight edged radial fins integrally cast with the corresponding block and protruding from the cylinder and overhead structure thereof and extending from front to rear of the engine block, and providing extended air passages the full depth of the engine from front to rear and passing between the cylinders and the full width of the cylinder block from side to side.

10. An engine block for an air-cooled internal combustion engine as set forth in claim 9 in which there are plate means intervening between the cylinder blocks in engagement with and distributing heat received from the cylinder block fins.

11. An engine block for an air-cooled internal combustion engine as set forth in claim 9 in which there are plate means and auxiliary fins intervening between the cylinder blocks and distributing heat received from the cylinder block fins.

12. In an air-cooled internal combustion engine, a crankcase and a rigid engine block thereon comprising individual cylinder blocks clamped together into a single unit and having straight edged side fins extending from front to back of the engine between the cylinders of said blocks and tension plate means between the ends of said fins for distributing the heat received from said fins, said plate means being anchored to the top and bottom of the corresponding cylinders to exert a compressive force longitudinally reinforcing the block and transmitting stresses from the top of the block to the bottom thereof attached to said crank case.

13. An air-cooled internal combustion engine having separate cylinder blocks clamped together to form a unitary engine block and each formed as a single casting with peripheral fins straight edged at the sides to hold between the cylinder blocks reinforcing plate means engaging at the top and bottom of the corresponding cylinder blocks to transmit end to end stresses and correspondingly relieve and reduce the cylinder walls.

14. An air-cooled internal combustion engine as set forth in claim 13 in which the reinforcing plate means is in contact with auxiliary fin means extending between the cylinder block fins to greatly augment the total fin area.

15. An air-cooled internal combustion engine as set forth in claim 13 in which each cylinder block contains a pair of cylinders having their axes in a transverse plane.

RUDOLPH DAUB.

References Cited in the file of this patent

UNITED STATES PATENTS

| Number | Name | Date |
| --- | --- | --- |
| 871,636 | Sager | Nov. 19, 1907 |
| 1,162,345 | Frederickson | Nov. 30, 1915 |
| 1,679,973 | Jacobs | Aug. 7, 1928 |
| 1,897,182 | Terhaar | Feb. 14, 1933 |
| 2,199,423 | Taylor | May 7, 1940 |
| 2,209,078 | Gettinger | July 23, 1940 |
| 2,346,463 | Szekely | Apr. 11, 1944 |
| 2,467,992 | Riple Jr. | Apr. 19, 1949 |
| 2,491,630 | Voorhies | Dec. 20, 1949 |

FOREIGN PATENTS

| Number | Country | Date |
| --- | --- | --- |
| 852,206 | France | of 1939 |